Nov. 3, 1964   J. W. CONNER   3,154,865
AUTOMATIC WORK TABLE
Filed Jan. 4, 1962   6 Sheets-Sheet 1

Nov. 3, 1964
J. W. CONNER
3,154,865
AUTOMATIC WORK TABLE
Filed Jan. 4, 1962
6 Sheets-Sheet 2
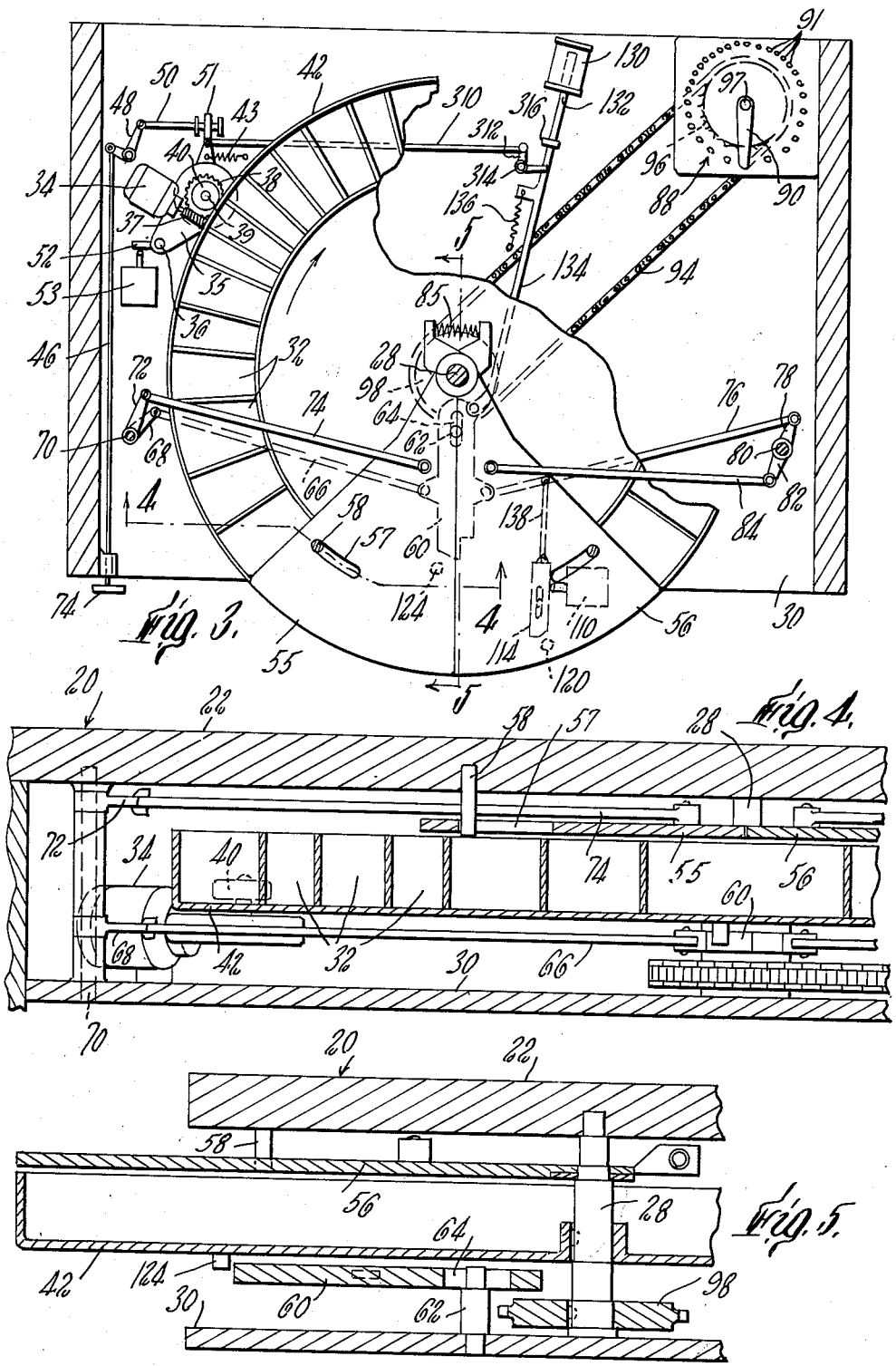

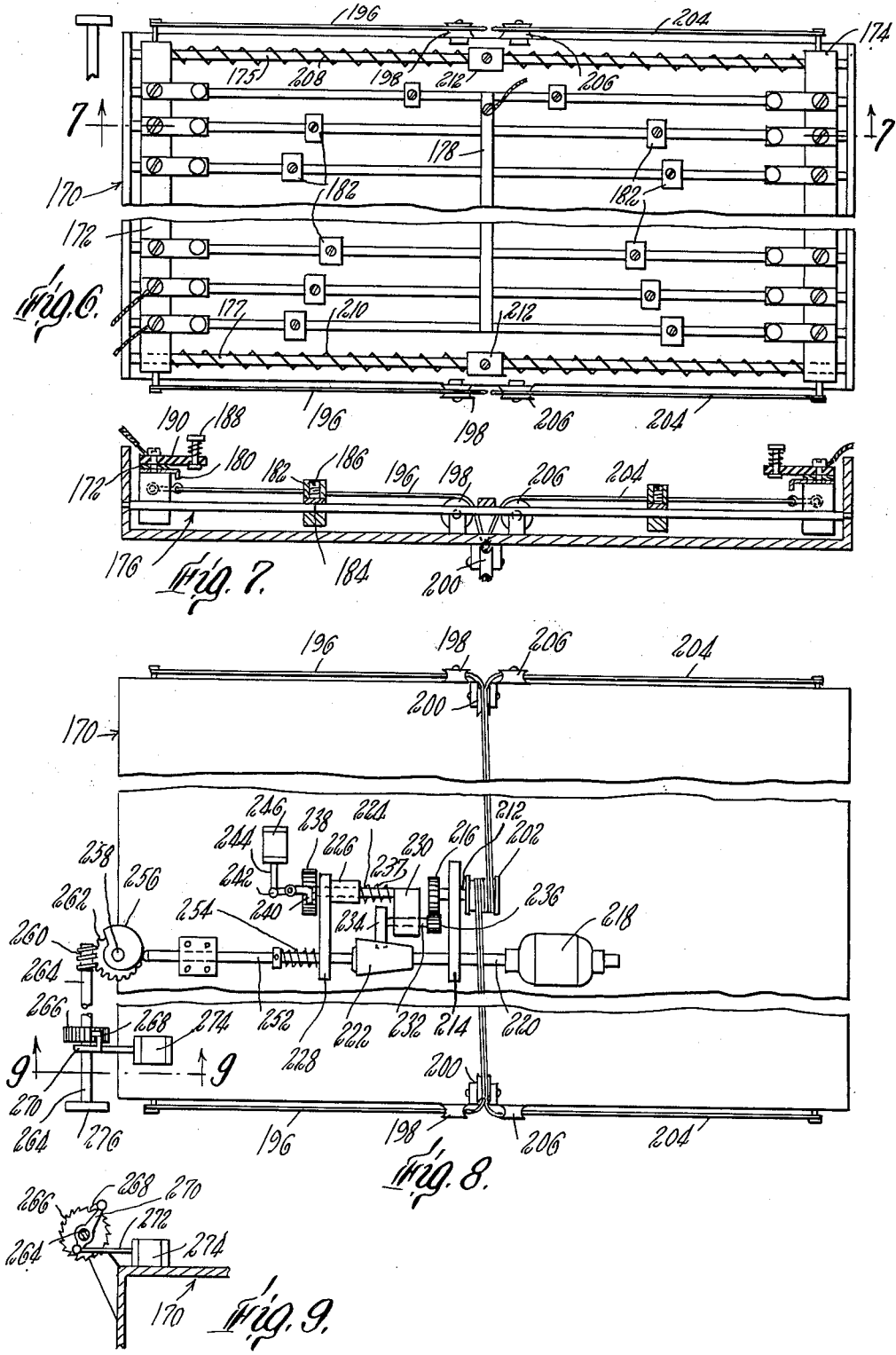

3,154,865
AUTOMATIC WORK TABLE
John W. Conner, 18 Skyline Drive, Wellesley, Mass., assignor of nineteen-fiftieths to Joseph W. Vincent, Wellesley, Mass., four-fiftieths to Warren G. Reed, Newton, Mass., and one-fiftieth to Richard J. Butze, Wellesley, Mass.
Filed Jan. 4, 1962, Ser. No. 164,370
29 Claims. (Cl. 35—13)

The present invention relates to improvements in work tables and more particularly to an automatic work table having means to present successive parts of a work assembly one after another within reach of the operator, and associated therewith means for instructing the operator to assist a rapid and accurate assembly of each said part into the whole, and to a method for carrying out the several objects of the invention.

It is a principal object of the invention to provide a novel and improved automatic work table of the general type above described which will enable the operator quickly and accurately to assemble a large number of parts into a work assembly with a minimum chance of error or breakdown.

It is another object of the invention to provide a novel construction and arrangement of a parts conveyor device by means of which parts to be assembled are presented in the precise order required at the work location, in combination with an instruction device, of which a visual indicator device is an example which provides adequate instructions to enable the operator rapidly and efficiently to assemble each part in turn on the work chassis.

It is another object of the invention to provide for use in an automatic work table of the general type described a timer device by means of which the length of time the tray is maintained in each successive position is determined.

It is another object of the invention to provide for use in an automatic work table assembly of the sort described a means for varying the total amount of time required for carrying out the assembly operation while maintaining the same proportionate timing for each of the several part assembly operations.

It is more specifically an object of the invention to provide means for controlling said variations in the amount of time allowed for carrying out the assembly operation in accordance with a varying curve which may, for example, be a hyperbolic curve plotted to show the average rate of improvement to be expected from new operators without previous experience, who are called upon to erect consecutively a substantial number of said assemblies.

Other objects of the invention relate to the provision of certain novel devices and combinations of elements for carrying out the objects of the invention above outlined.

A feature of the invention consists in the provision in an improved automatic table assembly of means for highlighting on a screen for visual inspection the position of a particular part in a work assembly, and of means for simultaneously presenting in the work area only that part to be picked up and assembled on the chassis by the operator in accordance with the instructions set forth in said visual direction diagram.

The apparatus provided for carrying out the several objects of the invention consists in a work table providing a work area including a work area supporting surface, a conveyor having compartments for storage of parts to be presented serially in said work area, and a visual indicator device adjacent said work area for simultaneously highlighting the position of each serially presented part as it is to be applied to the work assembly. In the preferred form of the invention shown the conveyor comprises a circular tray which is mounted directly beneath the work table and is provided around its periphery with a number of wedge shaped components which may vary in width according to the size of the parts to be incorporated in the work assembly. In order that only the wanted part may be made available to the operator at a time, a pair of cover members are provided which move to a closed position completely covering the projecting portion of the tray during the stepped advancing movement of the tray at the end of each successive dwell period when they are again moved apart a distance which is just sufficient to uncover the next presented compartment.

Another feature of the invention consists in the provision of a novel and improved visual indicator which in the present instance comprises a translucent screen on which is printed a work diagram of the work assembly, and behind said screen a large number of lights which are connected into individual circuits arranged to highlight only that part of the diagram which will show the part to be inserted, and its location on the work chassis.

Other features of the invention relate to the provision of an electrical operating and control system for applicant's automatic work table which include a selector switch connected to turn synchronously with the tray and which acts to energize successively selected operating circuits which are always identified with the same serially presented compartments of the tray. The tray is advanced by means of an electric motor which is actuated by a starting and stopping switch adapted in turn to be operated by cams on the tray to stop and to brake the motor as each successive compartment is moved into working position. Additional cams on the tray act to open the covers by an amount which is exactly proportioned to the width of the particular compartment. The mechanism for initiating each stepped advance of the tray consists of the solenoid and connections actuated thereby, which shift the starting and stopping switch to its run position, and which at the same time effect the return of the covers to their closed position.

In the preferred form of the invention shown, a timing device is employed which acts in conjunction with individual starting circuits for each stepped position of the tray and selector switch above described after a predetermined time delay to actuate the starting solenoid.

Further in accordance with the invention the timing device is controlled in such a manner as to permit automatic adjustment of the total elapsed time allowed for the assembly of all the parts including a proportionate increase or decrease as the case may be in the length of time permitted for each individual assembly operation.

With the above and other objects in view as may hereinafter appear the several features of the invention together with the advantages to be obtained thereby will be readily understod by one skilled in the art from the following description taken in connection with the accompanying drawings in which:

FIG. 3 is a sectional plan view taken on a line 3—3 of FIG. 2 illustrating particularly the tray, the cover members, the drive for the tray, and the selector switch;

FIG. 4 is a sectional view in front elevation taken on a line 4—4 of FIG. 3 illustrating particularly the mechanism for actuating the covers and the driving motor for the tray;

FIG. 5 is a sectional view in side elevation taken on a line 5—5 of FIG. 3 illustrating particularly the pivotal support for the tray and covers and the control stick by means of which the covers are moved to and from the closed position;

FIG. 6 is a plan view of the timing device controlling the length of the dwell periods between successive advances of the tray, a central portion of which has been broken away;

FIG. 7 is a sectional view taken on a line 7—7 of FIG. 6;

FIG. 8 is a bottom plan view of the timing device and includes the mechanism for advancing and for returning the timer slides to their starting positions;

FIG. 9 is a detail sectional view taken on a line 9—9 of FIG. 8 to illustrate the mechanism for imparting a stepped advancing movement to the timer contorl mechanism;

Figure 16:
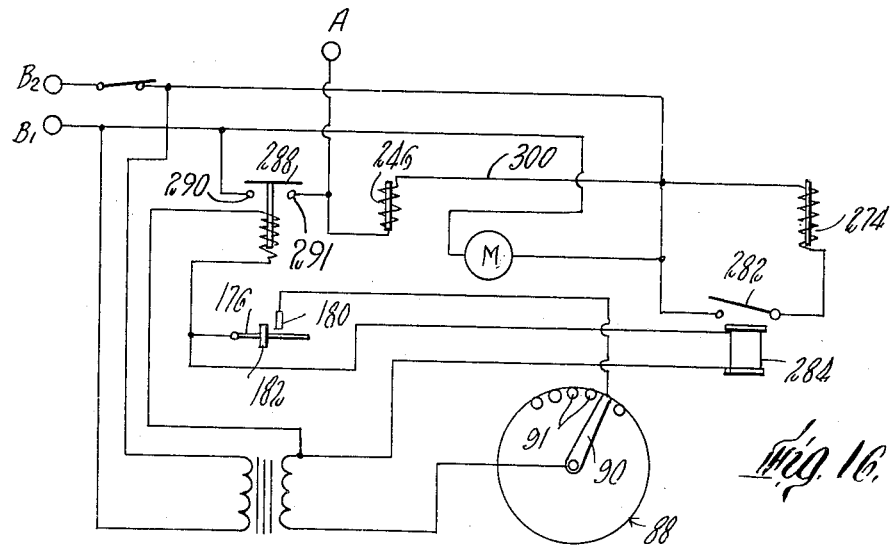
Figure 17:
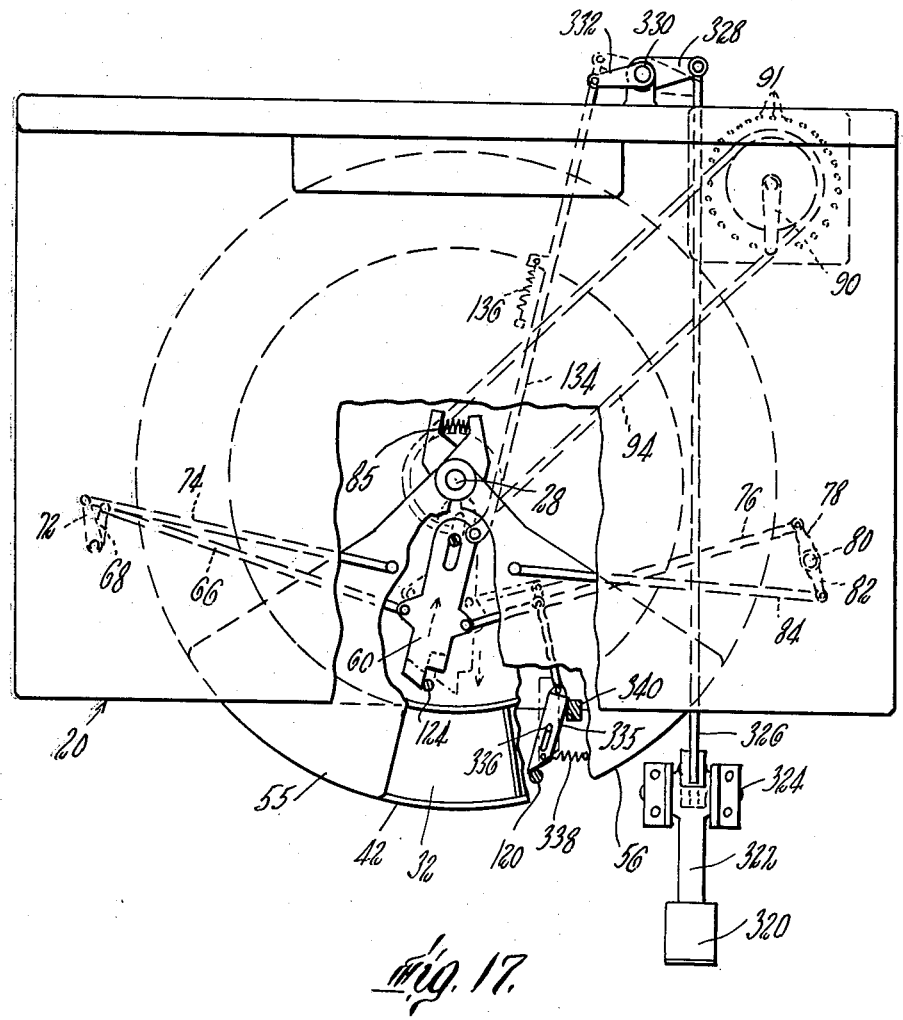

FIG. 16 is an electrical diagram of the timer circuit employed for initiating the stepped advance of the tray upon completion of a part assembling operation; and FIG. 17 is a somewhat diagrammatic plan view similar to FIG. 3 of a modification of the invention in which the electrical driving motor and starting control solenoid for the tray have been omitted and a foot treadle is provided for initiating each successive advance of the tray and the corresponding adjustment of the selector switch and visual indicator device associated therewith.

Referring to the drawings a work table 20 is provided having a work surface 22 on which a number of parts are to be assembled by an operator into a completed work assembly. In the present instance the automatic work table is particularly set up for the assembly of the parts of a radio set on a work chassis (not shown) which is placed on work surface 22 of the table 20. Immediately beneath the work surface 22 of the table there is provided a compartmented tray 26 which is approximately 2½ inches in depth and of sufficient diameter so that it extends outwardly from under the work surface 22 over the knees of an operator seated at the table. The tray is pivoted on a post 28 mounted from a horizontally disposed shelf 30 spaced beneath the work surface 22, and is provided with wedge shaped compartments 32 which are of varying width depending upon the size and shape of part which is stored therein. The number of compartments will, of course, depend on the number of parts to be assembled in the particular assembly. In the present instance there are fifty-six parts, the number of compartments shown, however, having been reduced for convenience of illustration.

A driving mechanism is provided for imparting a stepped rotational movement to the tray to bring each successive compartment into operating position within the work area. The tray is rotated by means of an electric motor 34 which serves also as a brake mounted at the rear left side of the work table on the shelf 30. The motor is mounted to turn on a horizontal axis on a support 35 pivoted at 36 on the shelf 30. A worm 37 (FIG. 3) on the armature shaft of the motor 34 engages a worm gear 38 of a vertical jack shaft 39, to the upper end of which is secured a friction driving roll 40 adapted for driving engagement with the peripheral band 42 which forms the outer face of the tray 26. A heavy spring 43 acts normally to bias the support 35 and the motor 34 against the tray so that the driving roll 40 is maintained in driving engagement with the band 42.

Starting and stopping of the motor 34 is controlled normally by means of an electrical control circuit hereinafter to be described. In the event, however, that the operator desires to rotate the tray manually, the motor 34 may be shifted to an inoperative position by means of a knurled knob 44 on the front left side of the machine which is attached to an axially shiftable rod 46 having connected at its rear end a crank 48 and link 50 having a lost motion connection with a bracket 51 on the support 35. Movement of the knob 44 and rod 46 forwardly causes the crank 48 to move counter-clockwise thus moving the motor 34 and associated connections including the friction driving roll 40 away from the tray against the pressure of spring 43. There is also attached to the support 35 a main switch arm 52 which is moved against the plunger of main switch 53 by the outward movement of the motor to disengage the main motor switch 53.

The tray is covered during the stepped advancing movement required to position successive compartments in operating position by means of a cover device comprising two wedge shaped cover members 55, 56 which are pivotally supported on the post 28 in the space provided above the tray and below the work surface 22. These covers are supported and arranged to be moved together to a cover position and alternatively to be moved apart simultaneously in opposite directions a sufficient distance to uncover the particular compartment from which a part is to be taken and installed on the work assembly.

Figure 1:
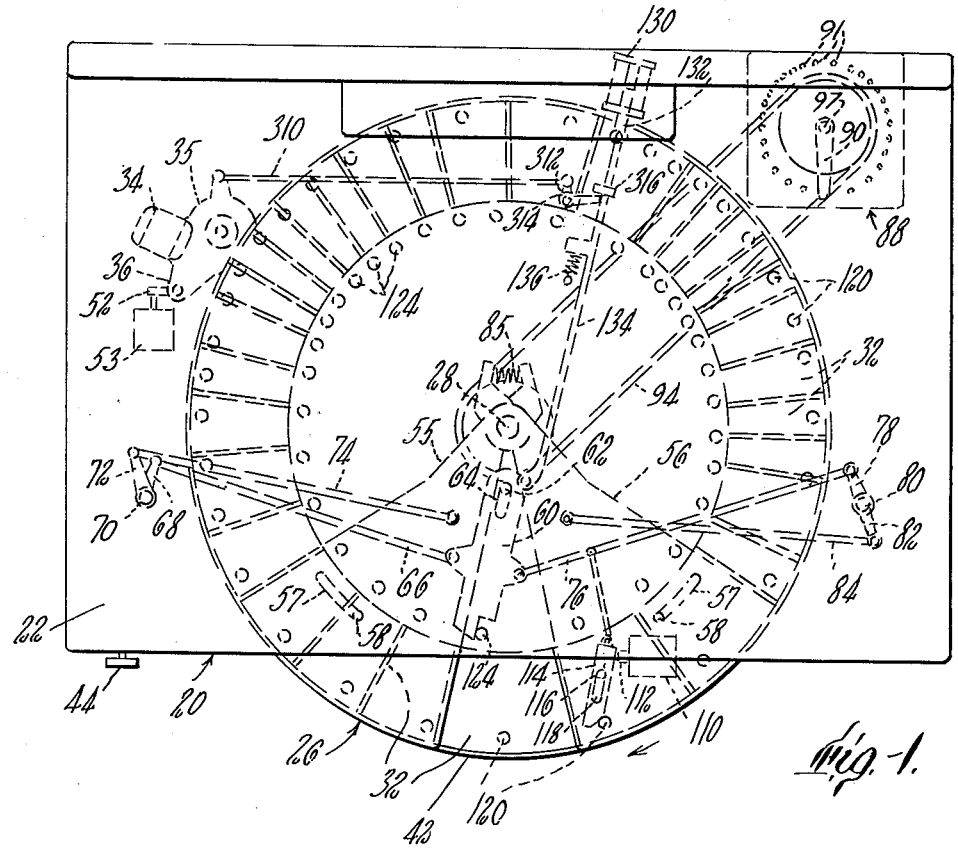
FIG. 1 is a plan view of the automatic work table showing particularly the work surface and the compartmented tray disposed beneath the work surface.

An arcuate slot 57 formed in each of the cover members 55 and 56 is arranged to receive a guide pin 58 which is formed with an enlarged head and is secured at its upper end into the underside of the work surface 22. The arcuate slots 57 and pins 58 are so arranged as to permit the covers to move freely from the closed position shown in FIG. 3 outwardly by an amount which is sufficient to fully uncover the widest compartment in the tray as shown in FIG. 1.

The operating mechanism for the cover members comprises a laterally swinging control member or stick 60 which is alternatively disposed in a forward and back position beneath the tray on the pivot 30 and is, for this purpose, supported at its rear end on a pivot post 62 which engages in a slot 64 in the control stick 60 permitting the control stick 60 a limited forward and back movement. Lateral swinging movements of the control stick 60 about its pivot 62 are employed to control the movements of the covers 55, 56 between their open and closed positions. A transversely extending link 66 is connected at one end to the stick 60 and at its other end to arm 68 attached to a lower end of vertically disposed rock shaft 70 at the left side of the automatic work table. An arm 72 secured to the upper end of rock shaft 70 is connected by means of a link 74 with the left hand cover member 55. The control stick 60 is similarly connected with the right hand cover member 56 through connections which include a link 76 connected between the stick 60 and an arm 78 on the lower end of a vertically disposed rock shaft 80 at the right hand side of the work table. An arm 82 secured to the upper end of said rock shaft 80 is connected by a link 84 with the right hand cover member 58. The linkage above described is so arranged that movement of the control stick about its pivot to the left causes the two cover members to be moved simultaneously equal distances in opposite directions away from the centrally closed position, the amount of such movement being in proportion to the extent of the movement imparted to the control stick. A compression spring 85 connected between two rearwardly extending ears of said cover members tends to return said members to the closed position. The control stick 60 is moved forwardly into an operating position in which the control stick is rocked by engagement with operating cams on the tray and is subsequently withdrawn while at the same time a cam actuated switch is operated to arrest and thereafter to advance the tray by means which will be hereinafter fully set forth.

The stepped rotational movement of the tray to present the individual compartments successively in operating position is accompanied by a corresponding advance of the rotatable switch arm 90 of a selector switch 88 (see FIG. 3) which is employed to initate and to coordinate the operation of the several components of the electrical system utilized in the operation of the automatic work table. The switch arm 90 is connected to move synchronously with the tray 26 to each of a series of stop positions which correspond with corresponding angular positions of the tray 26. In each said position a contact element is engaged to energize a selected operating circuit which is identified with a part contained in one of the serially presented compartments of the tray. The selector switch is provided with 56 stationary contact members 91 arranged in a circular relation with relation to a central switch arm 90 which is connected to turn with the tray by means of a driving sprocket chain 94 passing around a sprocket 96 on a pivotal supporting shaft 97 for the switch arm 90 and around a sprocket 98 (see FIG. 5) on the supporting post 28 for the tray 26.

Figure 10:
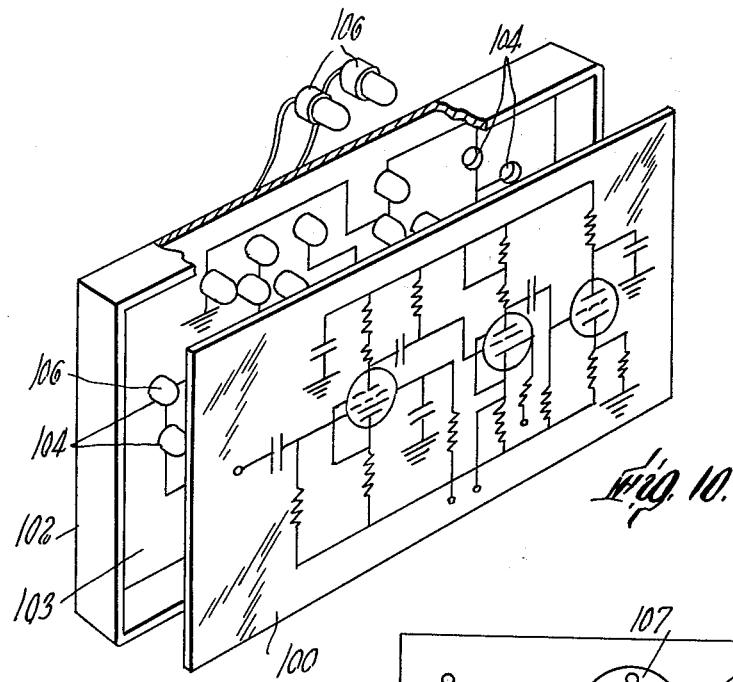
FIG. 10 is an exploded perspective view of the light box for supporting and for highlighting in a diagram parts of a work assembly to be assembled on the work surface of the work table.
Figure 11:
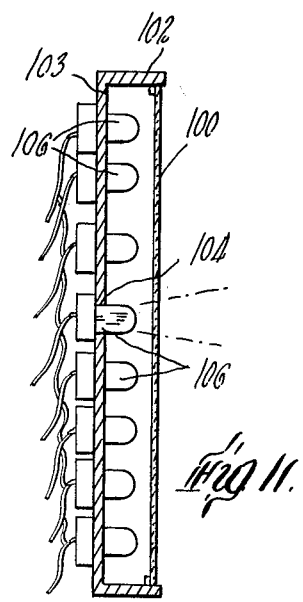
FIG. 11 is a sectional view taken on a line 11—11 of FIG. 10 but with the parts assembled in their normal operating position.

The visual indicator provided in accordance with the invention as best shown in FIGS. 10 and 11 comprises a translucent screen 100 mounted in a lightbox 102 above and across the work table from the operator. The translucent screen has formed thereon a working diagram of the work assembly to be put together by the operator on the work table surface 22. For lighting the screen, a series of holes 104 is punched through the back of the lightbox and a large number of lights 106 wired into appropriate circuits are pushed forwardly through said holes within said box directly adjacent the back side of the translucent screen. The location of said holes and lights supported therein is preferably accomplished in accordance with the following method. A blueprint is made of the diagram on the translucent screen and is secured to the bottom of the box. The holes are then punched through the box in positions which as indicated by the blueprint will effectively highlight the different parts shown in the diagram. The lights are then quickly pushed into position through said holes. These lights are connected to 56 separate lighting circuits, the lights being so grouped as to cause one or another selected part of the diagram to be highlighted thus indicating clearly to the operator the position and manner in which the said part is to be put into the work assembly. These individual circuits are connected respectively to the switch arm 90 of the selector switch and to a selected one of the contact members 91 to highlight the selected part in the diagram.

The lightbox above described together with the method of locating and inserting the light bulbs therein above described has the great advantage that different diagrams may be readily substituted for one another in the lightbox and corresponding changes may be made in the lighting provided quickly and with a minimum amount of expense.

Figure 12:
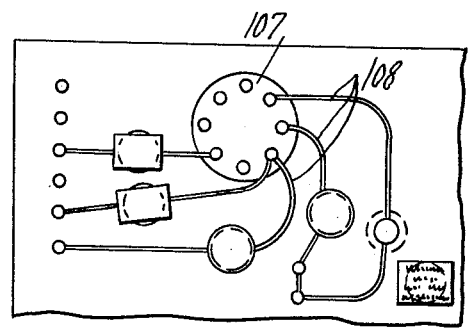
FIG. 12 is a fragmentary view of a portion of an electrical diagram illustrating particularly a radio tube socket together with certain connections thereto.
Figure 13:
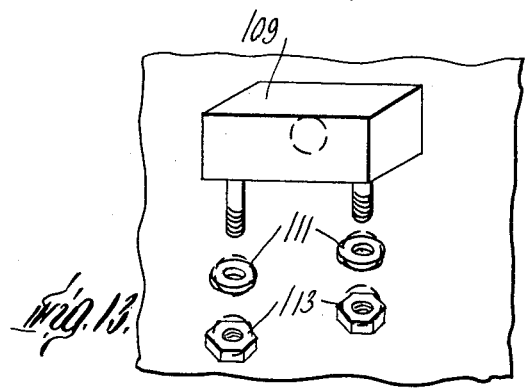
FIG. 13 is a fragmentary view showing parts of a mechanical assembly in exploded position to illustrate the manner in which these parts are assembled in a mechanical assembly.

FIG. 12 illustrates specifically a portion of an electrical diagram which is highlighted for the assistance of the operator assembling parts shown in a work assembly. In FIG. 12 is shown a radio tube socket 107 together with a number of leads 108 connecting the socket terminals with other parts of the work assembly. It will be understood that the invention in its broader aspects is not limited to the assembly of electronic devices such as a radio set, but may be applied with equal advantage for the assistance of the operator in erecting mechanical work assemblies of a complicated nature of which the several parts can be highlighted individually and in turn on the screen. The parts shown in FIG. 13, for example, consist of a bracket 109 including two posts, together with the associated washers 111 and nuts 113, these parts being shown in an exploded position which clearly indicates to the operator the manner of erection as well as the position of these parts in the work assembly.

Figure 2:
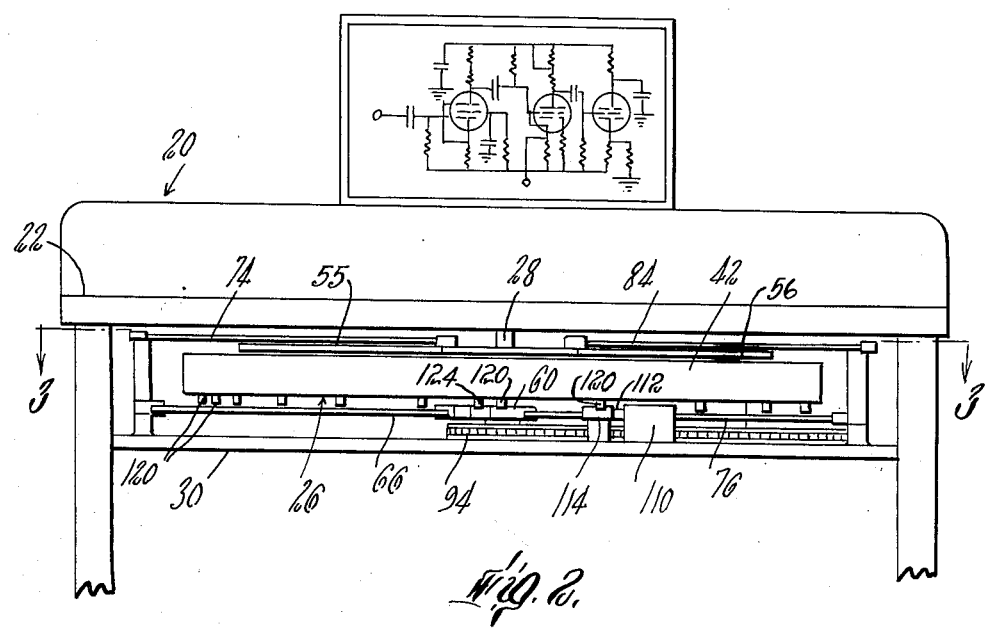
FIG. 2 is a view in front elevation of the automatic work table showni n FIG. 1 including additionally the visually indicated diagrams.

The actuating and control mechanism for imparting the desired stepped movement to the tray and for closing and opening the cover members comprises the control stick 60 and a plurality of operating devices including an electrically operated solenoid for advancing and retracting the control stick between an advanced operative and a retracted inoperative position, operating cam means actuated by the advancing movement of the tray to impart a rocking movement to the stick, and a motor operating switch which is controlled in part by said movement of the control stick. Referring specifically to FIGS. 1, 2 and 3, a motor starting and stopping switch 110 is mounted on the shelf 30 immediately adjacent the underside of the tray 26. The switch 110 is provided with a contact pin 112 which is spring pressed to a normally extended position in which an alternating current circuit including the motor 34 is closed so that the motor is energized. For shifting the switch 110 to off position in which the motor is de-energized and is electrically braked, a switch arm 114 is provided which is mounted intermediate its length on a pivot post 116 which is supported for a limited forward and back movement in a slot 118 formed in the shelf 30. When the pivot post 116 and switch arm 114 are in their forward position the forward end of the switch arm 114 is positioned in the path of a series of stop cams 120 located about the under face of the tray 26, one such stop cam being provided for each individual compartment 32. Rotational movement of the tray causes the first or immediately adjacent cam 120 in the series to engage and swing the switch arm 114 in a clockwise direction as shown in FIG. 1 so that the rearward end of the switch arm engages the contact pin 112 of stop switch 10 causing the motor 34 to be stopped and braked to hold the tray against further advance.

The advance of the tray to its next succeeding stepped position is utilized also to open the cover members 55, 56. For this purpose a second set of cams 124 is mounted about the underside of the tray 26 for engagement with the forward end of the control stick 60. During said advance of the tray a cam 124 is caused to engage with and swing the stick 60 from its neutral position by an amount which as shown in FIG. 1 is exactly in proportion to the width of the particular compartment which is being moved into the operating position. In the stopped position of the tray the switch 110 and the cover members 55, 56 continue to be held in their respective stop positions above described.

At the end of a dwell period of the tray during which the operator has removed a part from the exposed compartment and has assembled same on the work assembly in accordance with the direction of the diagram, the tray is given a stepped advancing movement and the covers 55, 56 are closed in the preferred embodiment of the invention shown by means of an electrically operated control mechanism which includes a table starting solenoid 130. The armature shaft 132 of said solenoid is connected by a link 134 with the tail end of the control stick 60. A tension spring 136 attached to the link 134 acts normally to maintain the entire assembly including the armature shaft 132, the link 134, and control stick 60 in an advanced table stop position as shown in FIG. 1. Energizing of the solenoid 130 causes said assembly including the control stick 60 to be shifted rearwardly so that the forward end of the control stick is moved away from the engaged cam 124 thus permitting the cover members to close under the influence of their spring 85. At the same time a link 138 connected between the transversely extending link 76 and the rearward end of switch arm 114 is shifted rearwardly with the control stick to disengage the switch arm 114 from the associated stop cam 120 so that the contact pin 112 of stop switch 110 is permitted to return to the operating position in which motor 34 is energized. The cycle above described which includes the advance of the tray, the engagement of the next succeeding cam 124 with the control stick 60 and the engagement of a stop cam 120 with the motor switch control arm 114 to stop the motor is now repeated.

Figure 15:
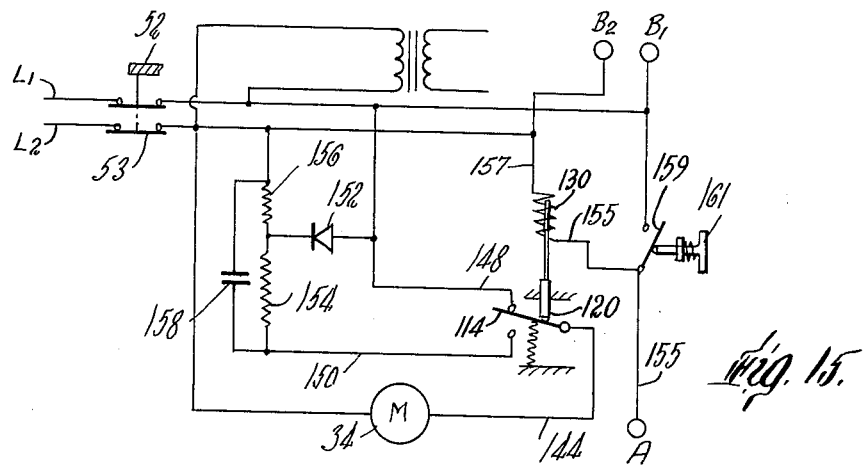
FIG. 15 is an electrical diagram illustrating the electrical circuit for the tray driving motor.

The actuating and control circuits provided with the preferred embodiment of automatic work table shown include specifically a motor circuit which operates when the motor start and stop switch 110 is shifted to its start position to supply alternating current to said motor 34 for advancing the tray. Movement of the table start and stop switch 110 to the stop position causes a direct current to be applied to the motor 34 which is then braked to resist rotation of the motor, and to maintain the tray in the desired stop position. This circuit as best shown in FIG. 15 of the drawings comprises the tray start and stop switch 110 shown as a single pole double throw switch, a lead 144 from the motor to the motor start and stop switch and two alternative leads from the switch to the motor including an alternating current lead 148 and a direct current lead 150 which is connected with a diode 152, resistances 154, 156, and a capacitor 158 connected in parallel to the resistances and diode. The arrangement above described acts as a standard form of A.C.-D.C. current converter. The motor operating circuit shown in the diagram of FIG. 15 is adapted to be operated automatically by the energizing of the table starting solenoid 130 through wire connections 155 and 157 with the timer circuit of FIG. 16 as hereinafter more fully described. The motor operating circuit may be operated manually without reference to the timer circuit by means of a foot switch 159 operated by a foot treadle 161 which is diagrammatically shown in FIG. 15. The operating connections to and functions performed by the foot switch will be hereinafter more fully described in connection with the timer circuit of FIG. 16.

Figure 14:
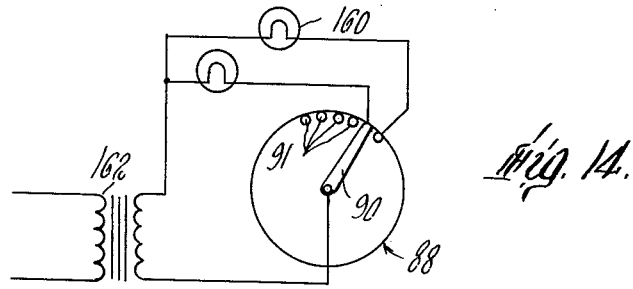
FIG. 14 is an electrical diagram of one of the lighting circuits for highlighting a particular part of the work assembly diagram.

For highlighting designated portions of the diagram to show particular parts a series of 56 identical lighting circuits are provided as shown in FIG. 14, each having a lead to the switch arm 90 of the selector switch 88, the other lead connecting with the particular series of lights 160 mounted upon the back wall of the lighting box 102. Power is supplied to the lead wires of the several circuits by means of a voltage reduction transformer 162. Each of the several circuits is energized in turn by the movement of the switch arm 90 of the selector switch from one to another of its contacts 91.

In the preferred construction shown a series of timing circuits are provided which are identified with the particular tray compartments presented in the working area, and which operate after the lapse of a time period determined adequate for the particular assembly operation to energize the tray start solenoid 130 and thereby to initiate the next succeeding stepped advance of the tray. Each of the several timing circuits is connected to operate the tray starting solenoid 130 and includes connections to the selector switch 88 and to a timing box 164 (see FIGS. 6 to 9 and 14) which provides adjustable means for controlling the length of the time period which must lapse before each compartment in turn is removed from the work area and another compartment is substituted therefor.

The mechanism for timing the dwell period required for the assembly of the parts stored in each individual compartment comprises a boxed-in timer unit 170 best shown in FIGS. 6, 7 and 8 of the drawings. In order to provide for the substantial number of independent timing circuits required, the timer unit 170 is provided with two separate timing circuit closing slides 172 and 174 which are normally positioned as shown in FIG. 6 at opposite sides of the unit 170 and are adapted to move toward one another on guide rods 175, 177. The slides 172, 174 are made of non-conducting material and are supported above a series of transversely extending current conducting rods 176 arranged in parallel relation and extending from one side to the other of the unit. Each of said rods 176 is connected preferably by means of a centrally located transverse conductor bar 178 into each of the several timer circuits as hereinafter more fully set forth.

Each of said slides 172, 174 is provided with a series of spring contact members 180 which are located above the rods 176 and are adapted to be brought into engagement with contact members 182 slidably adjustable on the respective rods 176. In order to obtain frictional contact, a pad or spring member 184 carried by the contact member 182 is arranged to be held against the rod 176 by means of an adjustable set screw 186. As hereinafter more fully set forth each of the slides 172, 174 is adapted to be moved inwardly toward the center of the timer unit 170 at a predetermined rate until the spring contact 180 of the active timer circuit is brought into engagement with the cooperating adjustable contact member 182 on the associated rod 176.

In the illustrated construction, means are provided for adjusting the position of each individual contact member 182, in accordance with the length of the dwell period required, which comprises a series of spring pressed plungers 188 secured to small brackets 190 on the slides 172, 174 immediately over the several supporting guide rods 176 for the adjustment contact members 182. At the beginning of a dwell period after a tray has been advanced to its next succeeding stepped position, a spring pressed plunger 188 is pressed downwardly so that it engages against and pushes said contact member 182 outwardly with the advancing slide 172, 174, but out of engagement with the spring contact 180. After a sufficient interval of time has elapsed to complete the particular assembling operation, the operator releases the plunger 188 thus arresting the movement of the adjustable contact member 182 and allowing the spring contact 180 to engage therewith to arrest further advance of the slide and to set in motion the mechanism for effecting the next succeeding stepped advance of the tray.

The mechanism for advancing and for returning the timer slides 172, 174 to their initially extended position shown in FIGS. 6 and 7 comprises a pair of cords 196 attached one to each side of the slide 172, which pass over idler pulleys 198 and thence around pulleys 200 inwardly to a centrally located wind-up drum 202. The slide 174 has similarly two cords 204 secured one to each side of the slide which pass around idler pulleys 206 and thence around the pulleys 200 inwardly to the drum 202. Rotation of the drum as hereinafter set forth causes the slides to be drawn inwardly to the central position toward one another. The slides 172, 174 are returned outwardly to the starting positions shown in FIG. 6 by means of compression springs 208 and 210 which are coiled about the guide rods 175, 177 for the slides 172, 174, each spring being seated at one end against the slide and at its other end against one of two centrally located brackets 212 secured to the guide rods 175, 177.

The wind-up drum 202 is mounted on a stub shaft 212 which turns in a bearing formed in a supporting bracket 214 and has secured to the remote end thereof a pinion 216. The drum assembly including pinion 216 is intermittently driven by an electric motor 218, a driving shaft 220 and a tapered friction driving cone 222. Power is transmitted from the cone 222 to the pinion 216 through a disconnectable driving connection which comprises a rock shaft 224 supported in a bearing 226 in a fixed bracket 228 in alignment with stub shaft 212. An arm 230 mounted on the shaft 224 carries a shaft 232 having mounted on one end a friction driven roller 234 for engagement with the driving friction cone and at its other end a small pinion 236 which is continuously in mesh with the pinion 216. A torsion spring 237 attached at one end to the arm 230 and at its other end to the bearing 226 tends to engage the roller 234 with the driving cone 222. In order to move the rock shaft 224 and arm 230 with the driven friction roller 234 out of driving engagement with the driving cone 222 there is provided on the outer end of the rock shaft 224, a ratchet 238 which is adapted to be engaged by a pawl 240 on an arm 242 which is pivoted on the outer end of the rock shaft 224 and which is arranged to be actuated by the armature shaft 244 of a solenoid 246. As hereinafter more fully set forth in connection with the electrical diagram, it may be noted that the solenoid 246 acts when energized to engage the pawl 240 with its ratchet 238, to rock the arm 230 and driven friction roller 234 away from the driving cone 222 against the pressure of spring 237 and thereby to arrest rotation of the drum 202 and to permit movement of the timer slides 172, 174 outwardly to their starting positions. The subsequent opening of the timer circuit as the selector switch arm 90 moves from one to another of its contacts 91 de-energizes the solenoid 246 and thus permits the friction driven roller 234 again to engage the driving cone 222 initiating a new advance of the slides 172, 174 in a new time delay cycle of the timer device.

The mechanism provided in accordance with the invention for varying the overall length of time for the erection of a work assembly including the proportionate adjustment of the time provided for the assembling of each individual part into the assembly comprises an adjusting means which acts when rendered operative to vary the rate of advance of the timer slides 172, 174 within the timer device. In the preferred embodiment of the invention shown, such adjustment is effected by shifting axially the position of the friction driving cone 222 thus effecting a variation in the driving ratio of the cone and driven friction roll 234 through which motion is transmitted from the constant speed motor 218, as shown in FIG. 8. The drive shaft 220 together with an in-line extension 252 thereof is biased outwardly by a compression spring 254 into abutting engagement with a contoured timing control cam 256 which acts when in operation to shift the cone 222 slowly to the right to gradually increase the rate of advance of the timing slides 172, 174. The cam 256 is mounted on a vertical jack shaft 258 which carries also a worm gear 262 arranged to mesh with a worm 260 on a cross shaft 264. A ratchet 266 on the cross shaft 264 (see FIGS. 8 and 9) is adapted to be acted upon by a pawl 268 mounted on a pawl lever 270 which is connected with the armature shaft 272 of a solenoid 274. With this arrangement, a small adjustment axially in the position of the friction driving cone 222 is obtained each time the solenoid 274 is energized causing the pawl 268 to effect a stepped angular movement of the cam 256 and cross shaft 264. The mechanism for adjusting the operation of the timing device above described may be employed, for example, for adjusting the rate of production in accordance with the advance in skill of a newly employed operator. In order to allow a maximum time interval for the performance of each part assembling operation, the friction driving cone 222 will be moved to the position at the extreme left as viewed in FIG. 8, hand wheel 276 on the end of the cross shaft 264 being employed for this purpose. A control circuit is then employed to energize the solenoid 274 once only during each complete revolution of the parts tray 26. In the illustrated construction the curve of the cam 256 is contoured to coincide with a plotted curve showing the average time required by new operators for each assembly operation during the erection of a substantial number of work assemblies. This curve is assumed to be hyperbolic in shape reflecting a very uneven rate of improvement in the efficiency of the average workman before a level of maximum efficiency is finally reached. These connections as best shown in FIG. 16 comprise a relay actuated switch 282 which is connected into one only of the 56 timer circuits, this being the particular circuit shown in FIG. 16. The closing of the timer contacts 180, 182 energizes relay 284 thus closing switch 282 which in turn energizes the solenoid 274.

The operation of the timer device to initiate the advance of the tray following each successive part assembling operation may be briefly described in connection with the electrical timer control diagram of FIG. 16. The power input lines $L_1$ and $L_2$ of FIG. 15 are connected at terminals $B_1$ and $B_2$ with terminals $B_1$, $B_2$ in the diagram FIG. 16. The line 155 of FIG. 15 is connected by means of a terminal A with a terminal A in FIG. 16. It is assumed that the switch arm 90 of the selector switch 88 has moved from one to another contact 91, thus rendering operative the next succeeding timing circuit which is assumed to be that shown in FIG. 16. Because the timer contacts 180, 182 are still open, the tray advancing solenoid 130 is de-energized so that the control stick 60 is maintained in its forward position in which the covers 55, 56 are held open and the main motor start and brake switch 110 is in its motor stop braking position. The solenoid 246 is de-energized permitting the friction follower roll 234 to engage the driving friction cone 222 for advancing the timer slides 172, 174.

Upon completion of the time interval required to install the particular part in the work assembly the switch contact 180 on timer slide 172 is brought into engagement with the adjustable switch contact 182 to close the timer circuit. Relay actuated switch 288 closes closing contacts 290, 291 so that solenoid 246 is immediately energized, and acts through pawl 240 and ratchet 238 to rock the friction follower roll 234 away from the friction driving cone 222 thus releasing the driving drum 202 and permitting the timer slides 172, 174 to return outwardly to their start positions under the influence of their springs 208, 210 thus resetting the timer. The solenoid 130 connected in parallel with solenoid 246 through plug A and wire 155 in FIG. 15 is energized causing the control stick 60 to be retracted under the influence of its spring 136. The control stick 60, moved away from the restraining cam 124, is permitted to straighten out and the covers 55, 56 to close under the influence of spring 85. At the same time, the motor start and stop switch control arm 114 is moved away from its restraining cam 120 allowing the motor start and stop switch 110 (FIGS. 1, 3 and 15) to return to its running position thus starting the next succeeding step advancing movement of the tray, and a movement of the switch arm 90 to the next succeeding contact thus de-energizing the circuit. As previously noted the particular timer circuit shown in FIG. 16 is assumed to be that employed in connection with the erection of the last or 56th part in the work assembly. Relay switch 282 is closed energizing solenoid 274 which effects a small stepped advance of the contoured cam 256 (see FIG. 8). It will be understood that switch means not specifically illustrated may be provided in the circuit of FIG. 16 for rendering the cam 256 advancing mechanism inoperative at the will of the operator or when the desired rate of assembly has been reached.

As previously noted there is also provided in the timer circuit of FIG. 15 a foot treadle actuated switch 159 which may be closed by the operator to initiate the successive stepped advancing movements of the tray.

The closing of foot switch 159 closes a circuit from the plug $B_1$ through switch 159, solenoid 130 and line 157 to plug $B_2$. The control stick 60 is withdrawn, and the main motor 110 is started causing the tray to rotate.

At the same time a parallel circuit is closed through plug A, wire 300 in FIG. 16, and solenoid 246 to main line L₂ thus disconnecting the feed for the timer slides 172, 174 which are permitted to return to their initial starting positions thus resetting the timer. With the construction above described the timer is always reset whenever the foot switch 159 is closed by operation of the foot treadle 161.

Assuming that the tray is being advanced automatically by the operation of the timer device the closing of the timer circuit by engagement of timer contacts 180, 182 causes solenoid operated switch 288 to close energizing solenoid 246 to reset the timer and at the same time energizing the solenoid 130 to withdraw the control stick 60 and start rotation of the tray.

Pressing of the foot treadle 161 by the operator operates in a similar manner through two parallel circuits to energize solenoid 246, thereby resetting the timer, and at the same time to energize the solenoid 130 thus initiating a further advance of the tray. The arrangement allows the timer to be set while the tray is in operation. It also allows the tray to be indexed if the operation for an individual compartment is completed before the timer is ready to index the tray.

In the event that the tray drive is rendered inoperative by pulling out the knurled head 44 and the consequent movement of the support 35 and motor and brake unit 34 including the driving friction roll 40 away from the tray 26, it is found desirable to also shift the control stick 60 for the covers 55, 56 and the switch 114 for the cam actuated motor start and stop switch 110 rearwardly out of engagement with their respective operating cams. To this end a transversely extending link 310 (see FIGS. 1 and 3) is provided connected at one end to the arm 51 of the motor support 35 and at its other end to a bell crank 312 pivoted at 314 on the shelf 30, the outward rocking movement of the motor support 35 acting to rock the bell crank 312 counter-clockwise causing the free arm of the bell crank 312 to engage an abutment 316 on the link 134 forcing the link 310, control stick 60 and motor start and stop switch arm 114 rearwardly out of the path of their respective cams 124, 120 against the pressure of spring 136. It will readily be appreciated that the tray 26 is now free to be rotated manually by the operator to any desired position for loading or inspection.

FIG. 17 illustrates a modified form of the invention in which operator controlled mechanical operation is substituted for the electric motor drive and a timer actuated stepped advance of the compartmented tray 26 shown, for example, in FIGS. 1 and 3.

As will be clearly evident from a comparison of FIG. 17 with FIGS. 1 and 3, the several tray and cover supporting and operating mechanisms of FIGS. 1 and 3 have been retained except for the electric driving motor 34, the table starting solenoid 130, and the motor start and stop switch 110. A foot treadle 320 is employed in place of the solenoid 130 of FIGS. 1 and 3 to withdraw the control stick 60 against the pressure of its spring 136. The foot treadle 320 is mounted on a bell crank 322 pivoted at 324 to the the base of the work table. An upwardly extending arm of the bell crank is connected by a link 326 with an arm 328 on a vertical rock shaft 330. A second arm 332 secured to the upper end of the rock shaft 330 is connected with the link 134 connected with the control stick 60. A downward pressure on the foot treadle 320 acts through the connections above described to move arm 334 rearwardly against the abutment 328 thus causing the link 132 and control stick 60 to be shifted rearwardly against the bias of spring 136.

In place of the start and stop switch 110 above described, a stop arm 335, similar to the switch arm 114, is provided having formed therein a slot for engagement with a stationary pivot pin 336. A spring 338 biased against the stop arm 335 acts normally to maintain the stop arm in a straightened-out position. Rotational movement of the tray 26 causes the stop arm 335 to be engaged by a stop cam 120 and rocked in a clockwise direction to a limiting position in which the tail end of the stop arm 335 engages a stop abutment 340 mounted on the under side of the table support 22.

The operation of the modified form of applicant's work table illustrated in FIG. 17 is as follows:

It is assumed that the tray 26 is located with one of the compartments 32 in operating position, with the control stick 60 held in its advanced position by the spring 136 and swung to the left by engagement with a cooperating cam 124 so that covers 55, 56 are open. It is further assumed that the stop arm 335 is engaged against a cooperating cam 120 and has also been swung to the left to its limiting position against the stop abutment 340 as positively limiting the clockwise advancing movement of the tray. It will be understood that the selector switch arm 90 connected to turn with the tray 26 by means of a sprocket chain 94 has closed the appropriate one of the lighting circuits illustrated in FIG. 14.

When the operator has finished installing the particular part in the work assembly, he will step on the foot treadle 320 thus causing the control stick 60 and stop arm 335 to be drawn rearwardly out of engagement with their respective cams 124, 120 and straightened out. When the foot treadle 320 is now released and the control stick 60 and stop arm 335 are permitted to return forwardly under the influence of spring 136, these parts are moved forwardly to the dotted-line straightened positions shown in FIG. 17 in which each said element is on the following side of its cooperating cam. The operator is now free to advance the tray manually. The selector switch 90 is at the same time shifted into engagement with its next succeeding contact 91. The advance of the tray acts to bring a next succeeding cam 124 into engagement with the control stick 60 again swinging the control stick a sufficient distance to open the covers 55, 56 while at the same time a stop cam 120 engages the stop arm 335 causing same to be rocked clockwise to the limited position in which the rear arm engages the abutment 340. The corresponding advance of the selector switch arm 90 causes a new lighting circuit to be energized (FIG. 14) to highlight the part to be installed in the work assembly.

It will be understood that while certain features of the invention including particularly the timing mechanism and the visual indicator mechanism herein described have been found to be of the greatest value and to operate with the highest degree of efficiency for the control of an automatic work table, these features of the invention are not limited in their application to the embodiment shown, but are well adapted for use in operations of other types which will include the assembly of parts which are not suited for assembly line handling, and for the control of other types of sequential operation in a machine or in a process.

The invention having been described what is claimed is:

1. An automatic work table for the performance by an operator of a series of part operations upon a work assembly built up of a series of parts having, in combination a work table providing a work area for said assembly, a conveyor having compartments each adapted to store a part identified for use in connection with one of said operations, said conveyor being movable by steps to different positions in which individual selected compartments are presented in a position accessible to the operator in the sequence in which the identified part operation is to be performed, moving means operatively connected to the conveyor for effecting said stepped movement in said sequence, an instruction device having a series of visual instruction presentation elements activated to present adjacent said area for visual inspection by the operator individual visual guidance instructions concerning each said part operation, and means coupling said conveyor means with said instruction device for actuating said instruction device in synchronism with the stepped movements of said conveyor to cause the appropriate visual instruction presentation element to be activated when a selected compartment of the conveyor is moved to said operator accessible position.

2. An automatic work table according to claim 1 in which said means by which the instruction device is coupled with the conveyor comprises a selector device connected with said instruction device shiftable to present said visual instruction projecting elements serially for visual inspection by the operator, and connections between the selector device and the conveyor synchronizing the shifting movements of said selector device with the stepped advancing movement of said conveyor so that the presentation of each said compartment is accompanied by the activation of a corresponding serially presented visual instruction projecting element appropriate to the part stored in the compartment.

3. An automatic work table according to claim 1 wherein said instruction device comprises a visual indicator adjacent said work area including a diagram for said assembly, and means for selectively highlighting only such parts of the diagram as are appropriate to a given assembly operation.

4. An automatic work table for use by an operator in the assembly of a multiplicity of parts on a work assembly having, in combination, a work table providing a work area including a work assembly supporting surface, a tray pivotally supported on said work table having compartments for parts to be successively installed in said work assembly to be presented serially in operating position in said work area, a visual indicator device adjacent said work area including a diagram of said work assembly, and lighting means including individual circuits for each said part for highlighting serially on said diagram the location of each said part in said assembly, a rotatable selector device for selectively connecting said circuits, and driving means connecting said tray and said selector device for synchronizing the closing of said circuits with the successive stepped positions of said tray and said compartments.

5. An automatic work table for the performance by an operator of a series of part operations upon a work assembly built up of a multiplicity of parts in a predetermined sequence of part operations having, in combination, a work table providing a work area for said assembly, a conveyor having compartments each adapted to store parts to be used in one of said operations, said conveyor being movable to present said compartments individually to a position accessible to the operator in the sequence in which their contained parts are assembled, and means for automatically moving said conveyor intermittently as required to present said compartments to said position in said sequence repetitively, and means connected to said moving means for maintaining said compartments in said position for different predetermined time intervals required for the different assembly operations of said sequence to which said compartments correspond.

6. An automatic work table according to claim 5 for use in operator training wherein said last named means includes means timed with relation to successive sequences of assembly operations for progressively shortening said time intervals while maintaining the same timed relation of said intervals to accord with increasing proficiency of an operator.

7. An automatic work table for use in operator training in the assembly of a multiplicity of parts in a predetermined sequence of assembly operations having, in combination, a work table providing a work area for said assembly, a conveyor having compartments each adapted to store parts to be used in one of said operations, said conveyor being movable to present said compartments individually to a position accessible to the operator in the sequence in which the contained parts are assembled, means for automatically moving said conveyor intermittently as required to present said compartments to said position in said sequence repetitively, a timing device operatively coupled to said moving means including individually adjustable time delay elements for maintaining each said compartment in said position for an individually predetermined time interval required for the different assembly operations of said sequence to which said compartments correspond, a time control device including a cam having a stepped operation upon completion of predetermined repetitions of said sequence of movements of said conveyor to progressively shorten, in varying increments, said time intervals to predetermined minimums equal to time intervals required for the several assembly operations by a trained operator, said increments being equal to a predetermined amount by which the corresponding number of repetitions of said sequence of assembly operations is expected to reduce the time required by an untrained operator to perform each operation.

8. An automatic work table as claimed in claim 7 which also includes an instruction device for presenting serially adjacent said work area guidance instructions concerning said operations, and means operatively coupling said instruction device with said moving means for synchronizing the presentation of said instructions with the movement of said conveyor.

9. An automatic work table for use by an operator in the assembly of a multiplicity of parts on a work assembly having, in combination, a work table providing a work area including a work assembly supporting surface, a tray pivotally supported beneath said work assembly supporting surface having compartments for parts to be installed in said work assembly arranged to be projected serially into said work area, a cover assembly located between the tray and the under side of the work surface movable between a tray covering position and an open position in which a projected compartment of said tray is uncovered, means for imparting a stepped rotational movement to said tray to successive working positions in which said compartments are projected serially into said work area, and means connected to said cover assembly and operative during said stepped movements of said tray for moving said cover assembly to the cover position during rotational movement of the tray, and to open position uncovering a projected compartment for each successive working position of said tray.

10. An automatic work table for use by an operator in the assembly of a multiplicity of parts on a work assembly having, in combination, a work table providing a work area including a work assembly supporting surface, a parts supply tray pivotally supported beneath said work assembly supporting surface having compartments of random width adjacent the peripheral portion of said tray to be presented serially in operating position in said work area, a cover assembly located between the tray and the underside of the work surface comprising a pair of pivotally mounted cover members movable in opposite directions between a compartment closing and a compartment uncovering open position, a tray advancing device for imparting a stepped rotational movement to said tray to position said compartments serially in said operating position, means for shifting said cover members between said compartment closing and open positions, and actuating means operative to advance the tray and in timed relation to said advance to close said covers, and alternatively to arrest the tray and to open said covers.

11. An automatic work table for use by an operator in the assembly of a multiplicity of parts on a work assembly having, in combination, a work table providing a work area including a work assembly supporting surface, a parts supply tray pivotally supported on said work table having compartments of random width adjacent the peripheral portion of said tray to be presented serially in operating position in said work area, a cover assembly located above the tray on said work table comprising a pair of pivotally mounted cover members movable in opposite directions between compartment closing and compartment open positions, a tray advancing device for imparting a stepped rotational movement to said tray to position said compartments serially in said operating position, means to effect successive stepped advances of said tray, each controlled to position a next succeeding compartment in operating position, and means for effecting the opening of said covers controlled to vary said opening in accordance with the width of each successively presented compartment.

12. An automatic work table for use by an operator in the assembly of a multiplicity of parts on a work assembly having, in combination, a work table providing a work area including a work assembly supporting surface, a parts supply tray pivotally supported beneath said work assembly supporting surface having compartments of random width adjacent the peripheral portion of said tray to be presented serially in operating position in said work area, a cover assembly located between the tray and the underside of the work surface comprising a pair of pivotally mounted cover members movable in opposite directions between compartment closing and compartment open positions, means for imparting a rotational advancing moving to the tray, a control member connected with said covers movable to open and close said covers, means to arrest the tray and automatic control means controlled by the movement of the tray to actuate said tray arresting means and to move said control member to open said covers, and means acting when rendered operative to shift said control member to close said covers and to cause said tray advancing means to advance said tray.

13. For use in supplying the operator with a multiplicity of parts serially in a work area for erection into a work assembly, the combination of a work table, a tray rotatable about a vertical axis on said work table having a series of compartments of random width adjacent one another and having radially extending partitions, a cover assembly disposed over the tray comprising a pair of cover members supported to turn on said vertical axis movable in opposite direction to a compartment closing position and a compartment open position, means for imparting a stepped advancing movement to the tray to position said compartments successively in said work area, and means for closing said covers during the said stepped advancing movement, and for moving said covers to an open position to uncover each successively positioned compartment.

14. For use in supplying the operator with a multiplicity of parts serially in a work area for erection into a work assembly, the combination of a work table, a tray rotatable about a vertical axis on said work table having a series of compartments of random width adjacent one another and having radially extending partitions, a cover assembly disposed over the tray comprising a pair of cover members supported to turn on said vertical axis movable in opposite directions to a compartment closing position and to a compartment open position, means for imparting a stepped advancing movement to the tray to position said compartments successively in said work area, cams on the tray, cam follower means connected with said covers arranged to be acted upon by said cams to open said covers by an amount only as determined by the width of the compartment moved to said work area, and control means for initiating said stepped advance of the tray and simultaneously for actuating said cam follower means to close said covers.

15. An automatic work table for use by an operator in the assembly of a multiplicity of parts on a work assembly having, in combination, a work table providing a work area including a work assembly supporting surface, a parts supply tray pivotally supported on said work table having compartments of random width adjacent the peripheral portion of said tray to be presented serially in operating position in said work area, an electric motor and brake unit connected to drive and to arrest said tray, a motor control switch means including a switch having alternative motor running and motor brake stop positions, a switch control element shiftable between a switch operating and inoperative positions, cam means operated by the rotation of said tray to engage the switch control element for the switch operating position thereof to shift said motor control switch to said brake stop position, a tray start solenoid, and a linkage connection between said tray start solenoid and said control element shiftable by said solenoid to move said control arm to the inoperative position thereby to effect the return of said switch to said motor running position.

16. An automatic work table in accordance with claim 15 in which a swivel mounting is provided for said motor running and braking unit, a separable driving connection is provided between the motor and braking unit and tray, and a manually operable device is connected to the said swivel mounting for moving same to disconnect said separable driving connection.

17. An automatic work table for the performance by an operator of a series of part operations upon a work assembly built up of a multiplicity of parts having: a work table providing a work area including a work assembly supporting surface, a parts supply tray pivotally supported on said work table having compartments adjacent the peripheral portion of said tray to be presented serially in operating position in said work area for time intervals individually adjusted to the time required for the particular part assembly, means for imparting a rotational advancing movement to said tray, and automatic control means for effecting a stepped advance of said tray including means for arresting the advance of the tray with each said compartment serially in operating position in said work area, control means for starting the tray from each said operating position, a timing device including an individual timing control associated with each said compartment for actuating said control means to start said tray following the lapse of a predetermined time interval following the arresting of said compartment in said operating position, a selector device rotatably shiftable to render operative selectively selected timing controls and means connected between the tray and the selector device for rotating the latter in synchronism with said tray.

18. An automatic work table for the performance by an operator of a series of part operations upon a work assembly built up of a multiplicity of parts having: a work table providing a work area including a work assembly supporting surface, a conveyor having compartments for parts to be presented serially in said work area for time intervals individually adjusted to the time required for the particular part assembly, moving means for the conveyor, and an automatic control means operatively coupled with said moving means for effecting a stepped advance of said conveyor, said control means including means for arresting the advance of said conveyor with each said compartment serially in operating position in said work area, a timing device including an individual timing control associated with each said compartment operable following the lapse of a predetermined time interval following the arresting of said conveyor to initiate a further stepped advance of said conveyor, and means for individually adjusting each of said timing controls to the time required for each individual part assembly.

19. An automatic work table for the performance by an operator of a series of part operations upon a work assembly built up of a multiplicity of parts having: a work table providing a work area including a work assembly supporting surface, a conveyor having compartments for parts to be presented serially in said work area for time intervals individually adjusted to the time required for the particular part assembly, means for imparting a stepped advance to said conveyor to position said compartments serially in operating position, and an automatic control mechanism comprising an electrical motor and brake unit for effecting the stepped advance of said conveyor to position each said compartment serially in operating position comprising starting and stopping switch connections for said motor and braking unit, cam means on said conveyor acting on said switch connections for arresting each successive advance of the conveyor with the next serially connected compartment in operating position, an electrically operated means for initating each stepped advance of said conveyor, a timing device including an individual timing control associated with each said compartment, a selector switch shiftable to render said timing controls serially operative, and means connecting the selector switch with said advancing means for shifting the selector switch in synchronism with the advance of said conveyor.

20. An automatic work table for the performance by an operator of a series of part operations upon a work assembly built up of a multiplicity of parts having: a work table providing a work area including a work assembly supporting surface, a parts supply tray pivotally supported on said work table having compartments adjacent the periphery of said tray to be presented serially in operating position in said work area for time intervals individually adjusted to the time required for the particular part assembly, means for imparting a rotational advancing movement to said tray, and an automatic control mechanism comprising an electrical motor and brake unit for effecting the stepped advance of said tray to position each said compartment serially in operating position comprising a starting and stopping switch for said motor and braking unit, cam means on said tray acting on said switch for stopping the motor to arrest each successive advance of the tray with the next serially connected compartment in operating position, a solenoid and connections actuated thereby for shifting said switch to motor run position, a timing device including indiviual timing controls associated with each said compartment, a shiftable selector switch connected between said solenoid and said individual timing controls to render said timing controls serially operative, and means coupling the selector switch with said tray to be shifted in synchronized relation with the advance of said tray.

21. An automatic work table for use by an operator in the assembly of a multiplicity of parts on a work assembly having: a work table providing a work area including a work assembly supporting surface, a conveyor having compartments for storage of parts to be presented serially in said work area, and an automatic control means for imparting stepped advancing movements to said conveyor to position said compartments serially in said operating position, which comprises a conveyor starting and stopping switch means, operable for arresting the stepped advance of said conveyor to position each serially presented compartment in operating position, and operable to initiate the advance of said conveyor, and a timing device for actuating said switch to initiate each succeeding stepped movement of said conveyor following the lapse of a predetermined dwell time interval having a slide movable along a path from a predetermined start position, means for moving said slide along said path at a predetermined rate, and individual timing control circuits comprising separate guides extending along said path and timing switches in said circuits each comprising a switch contact member adjustable along the length of a said guide, and a co-operating circuit closing switch contact member on said slide, a selector switch shiftable to render operative a selected one of said timing control circuits, means connecting the selector switch to be shifted in synchronism with the stepped advance of said conveyor, and means arranged to be actuated by the closing of any selected one of said timing control circuits, to shift said conveyor starting and stop switch means to the starting position.

22. Automatic control means for an automatic work table in accordance with claim 21 in which mechanism is provided for variably adjusting the rate of movement of said slide and thereby the elapsed time provided for each successive predetermined dwell time interval.

23. Automatic control means for an automatic work table in accordance with claim 22 in which mechanism is provided which operates automatically at predetermined intervals for adjusting said mechanism to effect a step rate increase in said rate of movement of said slide.

24. An automatic work table for use by an operator in the assembly of a multiplicity of parts on a work assembly having: a work table providing a work area including a work assembly supporting surface, a conveyor having compartments for parts to be presented serially in said work area, and an automatic control means for effecting a stepped advance of said conveyor, said control means including means for arresting the advance of said conveyor with each said compartment serially in operating position in said work area, a timing device which comprises a selector device having means for adjusting said selector device to each of a series of selected operating positions, means for synchronizing said adjusting means with the stepped advance of said conveyor, a series of independent timing circuits connected with said selector device to be selectively activated by the adjustment of said selector device from one to another of said selected operating positions, each said timing circuit having a connection with said automatic control means to initiate the advance of said conveyor, and means for effecting a time delay closure of each selectively activated timing circuit which comprises an activating element movable along a predetermined path from a starting position, means for advancing said activating element from said starting position at a predetermined rate, switch contacts in each selectively activated timing circuit comprising a switch contact on said activating element and a cooperating stationary contact in each said timing circuit spaced from said switch contact on the activating element by a predetermined extent to be closed by a movement of said activating element from said starting position.

25. For use in timing a sequence of operations, a timing device which comprises a selector device having means for adjusting said selector device to each of a series of selected operating positions, a series of independent timing circuits connected with said selector device to be selectively activated by the adjustment of said selector device from one to another of said selected operating positions, and means for effecting a time delay closure of each selectively activated timing circuit which comprises a guideway, an activating element arranged to be advanced on said guideway from a starting position, means for advancing said actuating element along the guideway from said starting position at a predetermined rate, means actuated by the closure of any said circuit to initiate movement of said activating element, switch contacts in each selectively activated timing circuit spaced apart from said starting position in said path by predetermined extents to be closed by a movement of said activating element from said starting position into engagement therewith, and means controlled by the closing of said switch contacts upon completion of each said advance in each selectively activated timing circuit for automatically returning said activating element to the starting position.

26. For use in timing a sequence of operations, a timing device which comprises a selector device having means for adjusting said selector device to each of a series of selected operating positions for the performance of said sequence of operations, a series of independent timing circuits connected with said selector device to be selectively activated by the adjustment of said selector device from one to another of said selected operating positions for initiating successive operating cycles, and means for effecting a time delay closure of each selectively activated timing circuit which comprises a guideway, an activating element movable on said guideway along a predetermined path from a starting position, means for advancing said activating element from said starting position at a predetermined rate, switch contacts in each selectively activated timing circuit comprising a switch contact on said activating element and a cooperating stationary contact in each said timing circuit spaced from said starting position on the activating element along said path by a predetermined extent to be closed by a movement of said activating element from said starting position therewith, means for automatically returning said activating element to the starting position upon completion of each said advance, and time controlled means for varying the rate of advance of said activating element from one to another of said sequences of operations.

27. For use in carrying out a predetermined sequence of operations, a visual indicating device comprising a panel, indicia on said panel relating to said operations, a series of separate lighting circuits on said panel to highlight those portions only of said indicia at a time as relate to a corresponding one of said operations and in the desired sequence, a timing device which comprises a plurality of individually adjustable timing circuits connected with said respective lighting circuits for highlighting selected portions of said indicia, a selector device shiftable to activate said timing circuits in a predetermined sequence, and means for effecting a time delay closure for each selectively activated adjusted timing circuit for independently predetermined time intervals as required for each said operation of the sequence.

28. Means for carrying out a predetermined sequence of operations according to claim 27 in which means is provided for adjusting proportionately the amount of time provided for each individual timing circuit and a corresponding variation of the over-all time required for said entire sequence of operations.

29. An automatic work table for the performance by an operator of a series of part operations upon a work assembly built up of a multiplicity of parts in a predetermined sequence of assembly operations having, in combination, a work table providing a work area for said assembly, a conveyor having compartments each adapted to store parts to be used in one of said operations, said conveyor being movable to present said compartments individually to a position accessible to the operator in the sequence in which the contained parts are utilized, means for automatically moving said conveyor intermittently as required to present said compartments to said position in said sequence repetitively, a visual indicator adjacent said work area, means to display on said indicator a sequence of different guidance instructions corresponding to said sequence of assembly operations, means coupled with said driving means to operate said display means in synchronism with the movement of said conveyor so that the instruction displayed during each of said time intervals relates to the corresponding assembly operation, and means for controlling said conveyor moving means to maintain said compartments in said position for different predetermined time intervals required for the different assembly operations of said sequence to which said compartments correspond.

References Cited in the file of this patent

UNITED STATES PATENTS

| | | |
|---|---|---|
| 855,951 | Hull | June 4, 1907 |
| 1,490,326 | Joleen et al. | Apr. 15, 1924 |
| 2,209,858 | Steiert | July 30, 1940 |
| 2,242,189 | Zelov et al. | May 13, 1941 |
| 2,682,117 | Wales | June 29, 1954 |